(12) United States Patent
Vorage et al.

(10) Patent No.: US 11,224,235 B2
(45) Date of Patent: Jan. 18, 2022

(54) COAGULATED PROTEIN FOR HUMAN FOOD

(71) Applicant: Coöperatie AVEBE U.A., Veendam (NL)

(72) Inventors: Marcus Johannes Vorage, Balloo (NL); Hendrik Huttinga, Assen (NL); Marc Christiaan Laus, Haren (NL)

(73) Assignee: COÖPERATIE AVEBE U.A., Veendam (NL)

( * ) Notice: Subject to any disclaimer, the term of this patent is extended or adjusted under 35 U.S.C. 154(b) by 148 days.

(21) Appl. No.: 16/077,930

(22) PCT Filed: Feb. 16, 2017

(86) PCT No.: PCT/NL2017/050093
§ 371 (c)(1),
(2) Date: Aug. 14, 2018

(87) PCT Pub. No.: WO2017/142406
PCT Pub. Date: Aug. 24, 2017

(65) Prior Publication Data
US 2019/0082714 A1 Mar. 21, 2019

(30) Foreign Application Priority Data
Feb. 19, 2016 (EP) .................................... 16156486

(51) Int. Cl.
*A23J 3/14* (2006.01)
*A23L 2/66* (2006.01)
(Continued)

(52) U.S. Cl.
CPC ................. *A23J 3/14* (2013.01); *A23J 1/006* (2013.01); *A23L 2/66* (2013.01); *A23L 19/01* (2016.08);
(Continued)

(58) Field of Classification Search
CPC ... A23J 3/14; A23J 1/006; A23L 19/15; A23L 19/01; A23L 33/185; A23L 2/66
See application file for complete search history.

(56) References Cited

U.S. PATENT DOCUMENTS 4,073,952 A * 2/1978 Standing ................... A23B 7/02
219/759
2009/0238930 A1 * 9/2009 Sathivel ................... A23L 33/17
426/238

(Continued)

FOREIGN PATENT DOCUMENTS

| CA | 2 664 814 | 5/2008 |
| CN | 101528069 A | 9/2009 |

(Continued)

OTHER PUBLICATIONS

"Physical Characterization of Whole and Skim Dried Milk Powders" J Food Sci Technol (Oct. 2017) 54 (11):3433-3442.
(Continued)

*Primary Examiner* — Katherine D Leblanc
(74) *Attorney, Agent, or Firm* — Emerson Thomson Bennett; Daniel A. Thomson (57) ABSTRACT

The invention pertains to a coagulated root- or tuber protein product which is not horny. Such products are characterized by a small particle size, a low density and little color, which makes them suitable for human food applications. The invention further pertains to a process for obtaining non-horny root- or tuber coagulated protein, and to use of these products in human food applications.

18 Claims, 5 Drawing Sheets

(51) Int. Cl.
   A23L 19/15    (2016.01)
   A23L 33/185   (2016.01)
   A23L 19/00    (2016.01)
   A23J 1/00     (2006.01)
(52) U.S. Cl.
   CPC ............. *A23L 19/15* (2016.08); *A23L 33/185* (2016.08); *A23V 2002/00* (2013.01)

(56) References Cited

U.S. PATENT DOCUMENTS

2010/0040591 A1* 2/2010 Giuseppin ............ C07K 14/415
                                                        424/94.1
2010/0048873 A1   2/2010 Lotz et al.

FOREIGN PATENT DOCUMENTS

| JP | 2010 507 596 | 5/2008 |
| NO | 143559 A | 12/1980 |
| WO | 9703571 A1 | 2/1997 |
| WO | 2002 100 187 | 12/2002 |
| WO | 2008069650 A1 | 6/2008 |
| WO | 2008069651 A1 | 6/2008 |
| WO | 2016133448 A1 | 8/2016 |

OTHER PUBLICATIONS

"Produktionsrapport" Vattenkvalitelt 2013.
"High Moisture Extrusion Cooking of Pea Protein Isolates: Raw Material Characteristics, Extruder Responses, and Texture Properties" Journal of Food Engineering 127 (2014) 67-74.
"Is it Possible to Modulate the Structure of Skim Milk Particle Through Drying Process and Parameters?" Journal of Food Engineering 142 (2014) 179-189.
"Influence of Spray-Drying Conditions on Size end Size Distribution of Nonfat Dry Milk Particles." Departments of Agricultral Engineering and of Food Science, Michigan State University, East Lansing, J. Dairy Science, vol. 52, No. 1 (1968) 31-37.
EPO, International Search Report, Publication WO 2017/142406 for PCT/NL2017/050093, dated Aug. 24, 2017.

\* cited by examiner

COAGULATED PROTEIN FOR HUMAN FOOD

The invention pertains to coagulated root or tuber protein products, which are suitable for human food applications, and to a process to obtain such products, as well as use thereof in human food.

Coagulated protein products are known, and comprise for instance protein products obtained by acid or thermal coagulation. Coagulation of protein results in protein denaturation, so that the denatured protein is rendered insoluble, and coagulates to form a solid mass which may be isolated by for instance decantation, filtration or centrifugation.

A disadvantage of known coagulated protein products is that they are not suitable for human food applications. Despite the fact that the amino acid composition of root or tuber protein products is often favorable, known coagulated protein products are hard and solid (also called "horny"), and have a typical large particle size of d10 of 29 µm, d50 of 102 µm and d90 of 512 µm (dry particle size), which makes their organoleptic properties such as taste and mouthfeel unsuitable for human food applications. Once coagulated protein has turned horny, this process cannot be reversed. In addition, known products are often colored to such an extent that they cannot be used in human food.

In the present invention, we disclose for the first time a process to obtain a coagulated protein product which is not horny. Because the hard and solid character of the coagulated protein particles can be avoided, the product can be applied in human food applications, which benefit from the advantageous nutritional properties.

FIGURES

FIG. 1: microscope analysis of food-grade coagulated protein product according to the invention (FIG. 1a) and of conventional coagulated protein product (FIG. 1b). Scale bar in both pictures 0.5 mm.

DETAILED DESCRIPTION

The present invention discloses a coagulated root or tuber protein product, which is not horny and which can be used in human food applications. The non-horny coagulated protein product is characterized by a small particle size, a low color, a low density, low off-taste and low level of residual sugars, relative to known coagulated root or tuber protein products.

It has been found that a non-horny protein product can be obtained by subjecting the coagulated protein product to extensive washing. Surprisingly, it was discovered that formation of horny material is due to a range of sticky components, which stick to the protein even after washing. Upon drying, the protein coagulates due to the presence of these sticky components, and forms horny material. By extensive washing according to the invention, even the sticky components are removed, and a non-horny protein material can be obtained. Non-horny material has the advantages described above, which makes it suitable for use in human food applications.

Coagulated protein products have lost all enzymatic functionality, and can be produced in large quantities in large scale installations in comparison with native protein products. Coagulated protein products are not soluble in water, whereas native protein products generally have high solubility. As a result, coagulated protein products and native protein products have different application area's, and a coagulated protein product used in one application cannot be substituted for a native product, and vice versa. Therefore, the present coagulated protein product should be compared with known coagulated protein products, and not with native protein products.

The present invention discloses coagulated root or tuber protein. Root or tuber in this context pertains to the species of potato (*Solanum tuberosum* or Irish potato, a seasonal crop grown in temperate zones all over the world); sweet potato (*Ipomoea batatas*, a seasonal crop grown in tropical and subtropical regions, used mainly for human food); cassava (including *Manihot esculenta*, syn. *M. utilissima*, also called manioc, mandioca or yuca, and also including *M. palmata*, syn. *M. dulcis*, also called yuca dulce, which are semi-permanent crops grown in tropical and subtropical regions); yam (*Dioscorea* spp, widely grown throughout the tropics as a starchy staple foodstuff); yautia (a group including several plants grown mainly in the Caribbean, some with edible tubers and others with edible stems, including *Xanthosoma* spp., also called malanga, new cocoyam, ocumo, and also including tannia (*X. sagittifolium*)); taro (*Colocasia esculenta*, a group of aroids cultivated for their edible starchy corms or underground stems, grown throughout the tropics for food, also called dasheen, eddoe, taro or old cocoyam); arracacha (*Arracacoa xanthorrhiza*); arrowroot (*Maranta arundinacea*); chufa (*Cyperus esculentus*); sago palm (*Metroxylon*, spp.); oca and ullucu (*Oxalis tuberosa* and *Ullucus tuberosus*); yam bean and jicama (*Pachyrxhizus erosus* and *P. angulatus*); mashua (*Tropaeolum tuberosum*); Jerusalem artichoke (topinambur, *Helianthus tuberosus*).

Preferably, the root or tuber is a potato, sweet potato, cassava or yam, and more preferably the root or tuber is a potato (*Solanum tuberosum*).

Coagulated root or tuber protein pertains to any protein fraction which can be obtained from root or tuber. That is, coagulated root or tuber protein may pertain to a coagulated protein product comprising substantially all protein present in a particular root or tuber, but may also pertain to a fraction of protein present in that particular root or tuber, such as may occur on waste streams of root or tuber juice, where some protein has already been removed in a primary process. Preferably, the coagulated protein product is a product comprising substantially all protein present in a waste stream obtained from starch isolation.

The coagulated protein product is characterized by a d-10 of less than 30 µm, preferably less than 28 µm, more preferably less than 24 µm, more preferably less than 20 µm. It is further characterized by a d-50 of less than 75 µm, preferably less than 65 µm, even more preferably less than 55 µm, and a d-90 of less than 250 µm, preferably less than 200 µm, more preferably less than 150 µm, as determined on a dry product.

The d-10, d-50 and d-90 are common parameters to express particle size distribution. The d-50 is the volume median particle size, and indicates the diameter, in µm, that splits the distribution into two equal fractions, wherein half of the particle volume has a diameter above the median diameter, and wherein half of the particle volume has a diameter below the median diameter. It can also be referred to as Dv50.

Similarly, the d-10 indicates the diameter, in μm, that splits the particle size distribution into two (volume) portions, wherein 10% of the particle volume has a diameter below the d-10, and wherein 90% of the particle volume has a diameter above the d-10.

The d-90 is defined in a similar manner, and indicates the diameter that splits the particle size distribution into two (volume) portions, wherein 90% of the particle volume has a diameter below the d-90, and wherein 10% of the particle volume has a diameter above the d-90.

The (dry) particle size can be determined laser diffraction using a Sympatec HELOS equipped with a RODOS dry dispenser with a vibratory feeder. The RODOS dispersing line has an inner diameter of 4 mm. Particle sized is calculated by the integrated software using the "fraunhofer" formula. Particles size reported here all refer to the dry particle size.

Figure 6:
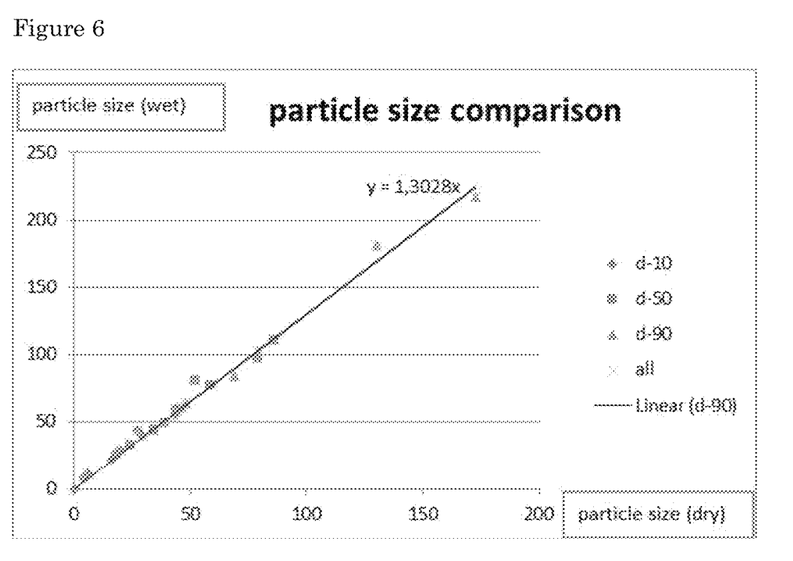
FIG. 6: Particle size ratio between dry (Sympatec) and wet (Malvern) particle size analysis techniques.

Particle size can alternatively be determined by a "wet" method. In that case, the "wet" particle size can be converted to a "dry" particle size by division of the wet particle size using 1.3 as conversion factor (FIG. 6).

The product is further characterized by a glycoalkaloid content of below 200 mg/kg, preferably below 150 mg/kg, more preferably below 100 mg/kg, even more preferably below 50 mg/kg. Glycoalkaloid levels influence the taste of the potato protein product. Bitter tasting potato varieties were reported to contain glycoalkaloid levels exceeding 140 mg/kg fresh weight, while a burning perception in the mouth and throat was apparent with levels above 220 mg/kg. In addition, glycoalkaloids are known to be poisonous, and their presence in consumption potatoes is restricted by law. Therefore, the glycoalkaloid level is preferably low. The glycoalkaloid content can be determined by the method of Alt and coworkers (V. Alt, R. Steinhof, M. Lotz, R Ulber, C. Kasper, and T Scheper—Optimization of Glycoalkaloid Analysis for Use in Industrial Potato Fruit Juice Downstreaming—Eng. Life Sci. 2005, 5, No. 6).

The protein product is further characterized by a low volumetric density of 475 gram per liter or lower, such as below 400 gram/liter, preferably below 350 gram/liter, more preferably below 300 gram/liter.

The protein product is further characterized by a low color. Low color in this context is expressed as the reflected color, which can be determined by a Hunterlab Colorflex EZ spectrophotometer as described below. The protein powder of the invention is characterized by a reflection color of greater than 0.50, preferably greater than 0.56, more preferably greater than 0.58, even more preferably greater than 0.60, most preferably greater than 0.62.

The protein product has preferably not been subjected to a step which actively reduces particle size by physical means, such as in a homogenizer, a wet or dry mill, or a dryer with milling function.

The protein product can suitably be obtained by a method comprising
a) subjecting the root or tuber fruit juice to a coagulation step to obtain coagulated protein;
b) collecting the coagulated protein;
c) washing the coagulated protein with washing water having a conductivity of below 1 mS/cm to obtain used washing water and washed coagulated protein; and
d) drying the washed coagulated protein,
wherein washing is continued until the used washing water has a conductivity of less than 2 mS/cm.

It has been found that extensive washing removes many of the sticky components which have been found to be responsible for the formation of horny protein material upon drying. These sticky components include among others sugars, potassium, and various organic acids and amino acids, in particular sugars. Sugars in this context are defined as the total of glucose, fructose and sucrose. A potato contains on average of 7.5 mg sugars/g potato. The total amount of sticky components can be as high as 35-40 mg/g potato. It has been found that the sticky components tend to "stick" to coagulated protein material, such that conventional washing does not sufficiently remove them, and a horny material is formed.

As a result, it is essential that root or tuber protein after coagulation is washed extensively prior to drying. When the coagulated protein material is washed until the washing water has reached a specific conductivity, this indicates that the sticky components are sufficiently removed so that the coagulated protein material does no longer form large horny lumps, but remains a powder with a small particle size, low color (high reflection color) and low density and other advantages as defined above. The specific conductivity of the used washing water at which coagulated protein material does no longer form horny material is 2 mS/cm, preferably 1.5 mS/cm, even more preferably 1 mS/cm.

Washing to these levels ensures that the sticky components, importantly sugars, are removed to a sufficient degree so as to avoid formation of horny material. Alternatively therefore, washing may be continued until the washing water contains less than 0.54 mg/g sugars, preferably less than 0.4 mg/g, more preferably less than 0.3 mg/g, more preferably less than 0.2 mg/g. Sugars in this context are defined as the total of glucose, fructose and sucrose. This results in a coagulated protein product which comprises less than 0.40 g/kg dry weight of sugars, preferably less than 0.35 g/kg dry weight. It has been found that these low amounts of sugars makes it possible to obtain a coagulated protein product which is not horny.

The present method to obtain non-horny coagulated protein material starts with subjecting the root or tuber fruit juice to a coagulation step to obtain coagulated protein. The root or tuber juice preferably has a protein content of 0.1-5 wt. %, more preferably 1-2 wt. % but may be concentrated prior to coagulation, such as to a protein content of 3-20, preferably 5-15 wt. %. Concentration may be achieved in any known way, such as for example by ultrafiltration, diafiltration or freeze concentration.

Coagulated protein can be obtained by heat or acid coagulation, preferably in water, or by subjecting the protein to a sufficient quantity of a coagulating organic solvent or precipitation aid, as is known in the art. These techniques or a combination thereof result in a suspension comprising coagulated protein.

Heat coagulation may be achieved by subjecting the protein, preferably in an aqueous environment, to heat, for a time long enough to coagulate the protein. This may be achieved by subjecting the protein to a temperature of at least 70° C., preferably at least 80° C., more preferably at least 90° C. or even to a temperature of 100° C. or even more, for a period of several minutes, preferably at least 30 minutes, more preferably at least 1 hr, even more preferably at least 2 hrs, such as for instance 30 min-5 hr or 1-4 hr. The higher the temperature, the shorter the time required for coagulation. In a preferred embodiment, coagulation is achieved at a temperature of 100-110° C., for a period of 1-60 seconds, for example at a pH of 4.5-6.

Acid coagulation may be achieved by subjecting the protein, preferably in an aqueous environment, to a strong acid, such as hydrochloric acid, sulphuric acid, or weak (an) organic acids such as phosphoric acid, citric acid or lactic acid. The pH in the coagulating mixture is preferably from 0 to 6, preferably from 2-6. In some embodiments, protein is coagulated by a combination of acid- and heat coagulation.

Coagulation may also be achieved by subjecting the protein to a sufficient quantity of a coagulating organic solvent. Such solvents are known in the art. Suitable coagulating organic solvents are for instance ethanol and propanol. Preferably, this is achieved by addition of the coagulating organic solvent to an aqueous environment comprising the protein. A sufficient quantity of the coagulating solvent can be at least 15 vol. % in water, preferably at least 20 vol. % in water, more preferably at least 40 vol. % in water.

Coagulation may also be achieved by subjecting the protein to a sufficient quantity of a coagulating agents. Suitable coagulating agents are for instance metal salts (for example $FeCl_3$, $ZnCl_2$ or $MnCl_2$. Suitable concentrations for using metal salts are 1-80 mM, preferably 10-50 mM. Alternatively, coagulation may be achieved by carboxymethyl cellulose (CMC) complexation (CMC/protein weight ratio 0.05-0.2, preferably 0.08-1.4). Preferably, this is achieved by adding the coagulating agent to an aqueous environment comprising the protein.

After the coagulation step, the coagulated protein is collected. This can be achieved by known methods, such as filtration, centrifugation or sedimentation.

Filtration may be achieved by passing the coagulated protein over a filter or membrane of 5-100 μm, preferably 10-30 μm.

Centrifugation by means of a centrifuge, decanter or hydrocyclone separator may be achieved by subjecting the suspension comprising coagulated protein to centrifugal forces, such as 50-4000 g.

Sedimentation may be achieved by allowing the coagulated protein to settle, and removing the water by decantation, such as in a settler or vessel.

After the coagulated protein has been collected, the protein must be washed. Washing of the coagulated protein should be achieved with washing water having a conductivity of below 1 mS/cm, preferably below 0.75 mS/cm, more preferably below 0.5 mS/cm, to obtain used washing water and washed coagulated protein. The conductivity of the washing water, before and after use, can be determined by a calibrated conductivity meter. Washing is continued until the used washing water has a conductivity of 2 mS/cm, preferably 1.5 mS/cm, even more preferably 1 mS/cm, as described above. Washing can be achieved by resuspension of the collected coagulate protein in washing water as defined, and flushing the resuspended product over a filter. If necessary, this process can be repeated, or additional washing water may be flushed over the filter, until the used washing water fulfills the requirements described elsewhere.

Alternatively, washing is continued until the sugar content of the washing water is less than 0.54 mg/g, as defined above. This results in washed protein material which is not horny, as described above.

The washed coagulated protein is subsequently dried. Drying may be achieved in any known way, such as by air drying or freeze drying. Drying results in a coagulated protein powder which has a water content of 0-10 wt. %, preferably 1-7 wt. %, and usually between 5-7 wt. %.

The dried protein powder generally has a protein content of at least 85 wt. % on dry matter, preferably at least 87 wt. %, as analyzed by Kjeldahl.

Air drying may be achieved by passing air over the washed protein until the washed protein is a dry powder. This generally takes from hours to days, depending on the quantity to be dried and the temperature of the air. Preferably, the protein powder is mixed or circulated in some way, so as to achieve optimal contact between the air and the protein powder, as is known in the art of drying powders. Air drying may be accelerated by using air at an elevated temperature, such as at least 50° C., preferably at least 80° C., more preferably at least 100° C., even more preferably at least 150° C., or even at least 200° C., or 250° C. Such conditions may suitably be achieved in a vacuum belt filter, spray dryer, flash dryer, ring dryer, turbo-rotor dryer, swirl fluidizer, ultra flash spin drier, flugschicht dryer, spouting bed dryer, fluid bed dryer or any other type of dryer where an intensive contact between wet particles and hot air is established.

Drying may also be achieved by freeze drying, which may be achieved by subjecting the wet, washed coagulated protein to sub-zero temperatures and a vacuum, so as to remove the remnant water by sublimation. Also in this case, the protein powder is preferably mixed during drying so as to optimize contact between the vacuum and the protein powder. The temperature during freeze drying is preferably between −40° C. and −90° C., more preferably between −50 and −80° C., at least until frozen ice has disappeared. The pressure is preferably between 1 and 200 mbar, preferably between 5 and 100 mbar. After the ice has disappeared, the temperature may be raised in order to remove remnant water from the coagulated protein material.

After drying, a coagulated root or tuber protein material is obtained as a dry powder. This powder is free from free amino acids, sugars, phospholipids and other compounds naturally present in potato, has a protein content of at least 85 wt. %, and is not native.

Optionally, the method further comprises a step of neutralizing the coagulated protein to a pH of 6.5-7. This neutralization step may be at any point after coagulation of the protein, such as during, before or after collection of the protein, or during, before or after washing of the protein. Preferably, the neutralization is performed after the washing, such as by using an additional step of neutralizing the protein product with water at a pH of 6.5-7.5. The pH of the washing water may suitably be set using conventional salts or buffers, such as phosphate, citrate or carbonate buffers. The pH may be determined by using a pH-meter calibrated against at a temperature of 20° C.

Further preferably, the neutralization is achieved by addition of a solid base salt, such as for instance a carbonate or bicarbonate salt, to the protein prior to drying. The protein content of the neutralized protein product is usually 2% lower than defined above due to addition of non-protein material.

The coagulated root or tuber protein material is optionally subjected to a glycoalkaloid extraction procedure where the protein coagulate is extracted with an organic- or anorganic acid at low pH (1-3.5) for the duration of 1 to 30 minutes after which the extracted protein is collected by any of the methods described above. The glycoalkaloid extraction procedure can be at any time after protein coagulation, but preferably, the glycoalkaloid extraction procedure is performed prior to the washing step.

When applying the present method, coagulated protein product can be obtained with a small particle size as defined above, without the need of reducing the particle size by physical means, such as by grinding, milling or homogenization.

Further optionally, the coagulated, washed and dried protein product is subsequently fractionated into at least a first fraction and a second fraction, that is, subjected to at least one step to separate coarse particles from fine particles. This maybe achieved by sieving, cycloning, wind sifting or any other known way. This results in at least two coagulated protein powder fractions, such as at least a fine fraction and a course fraction.

Sieving may be achieved by placing the dry coagulated protein powder on a sieve of 63 μm (230 mesh), so as to isolate a first, fine, fraction comprising all particles smaller than 63 μm, as well as a second, coarse, fraction comprising all particles larger than 63 μm. Sieving may also be achieved in a cyclone (wind sieve), or in any other way, so as to achieve coagulated protein particles of specific particle size.

The fractionated protein product may be in the form of a fine fraction, characterized by a d-10 of at most 12 μm, preferably at most 8 μm, a d-50 of at most 27, preferably at most 23 μm, and a d-90 of at most 46 μm, preferably at most 38 μm, even more preferably at most 35 μm.

The fractionated protein product may also be in the form of a coarse fraction, characterized by a particle size of having a d-10 of between 15-38 μm, preferably 15-30 μm, a d-50 of 42-69 μm, preferably 42-61 μm, and a d-90 of 150-250 μm, preferably 170-210 μm. The density of the coagulated protein product is only marginally affected by fractionation, and is comparable. Particle sizes of fractionated products have been determined by the wet method.

Coagulated protein products as obtained by the present invention are suitable for use in human food applications. The fine particle size results in a good mouthfeel, and the relatively low coloration results in only little coloration of the food product. Furthermore, the taste of the coagulated protein product is barely noticeable, so that the nutritious amino acid composition can favourably be added to any food product which may benefit from enrichment in protein.

In one embodiment, the food is a nutritious drink. Preferably, the coagulated protein powder is suspended in the drink. Further preferably, the coagulated protein product is a fine fraction of the coagulated protein product as defined above, so as to result in a stable suspension with the help of stabilizers.

In another embodiment, the food is a powdered beverage or a powder-based soup. Also, the food may be a protein, granola or other health bar, a breakfast cereal, a snack, such as an extruded, baked, fried or popped snack), a baked good or a baking mix, such as gluten-free bread or pizza, a pasta product, such as noodles or spaghetti, a meat product, such as deli meats, injected ham or sausages, or a vegetable-based meat analogue or texturized vegetable protein.

For the purpose of clarity and a concise description features are described herein as part of the same or separate embodiments, however, it will be appreciated that the scope of the invention may include embodiments having combinations of all or some of the features described.

The invention will now be illustrated by the following non-restricting examples.

EXAMPLES

Example 1

Potato juice was heat-coagulated at a temperature of 104° C. to obtain 12.9 gram solid protein particles/kg suspension. The protein particles were separated from the juice by means of a two-phase decanter at 4000 g. The coagulated protein obtained had a dry solid content of. 34 wt. %. A first portion of the coagulated protein was washed as is common in the art of washing coagulated protein powder and subsequently dried, whereas a second portion was resuspended in water and sulphuric acid was added until a pH of 3.3 was reached in order to remove glycoalkaloids. After stirring for 30 minutes, the protein suspension was dewatered and thoroughly washed by means of a vacuum belt filter.

The washing water used to wash the second portion before use had a conductivity of 0.4 mS/cm, and washing was continued until the conductivity of the used washing water was below 1 mS/cm.

The thorough washing of the second portion according to the invention took a considerably larger volume of washing water than the standard washing procedure applied for the first portion.

Figure 1A:
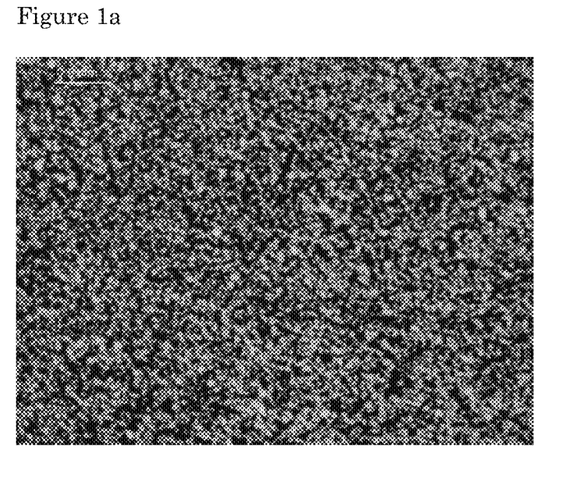
Figure 1B:
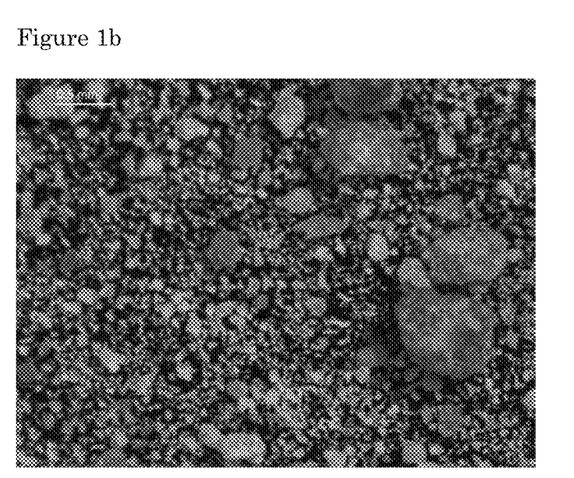

The first portion and the second portion were dried by means of a flash dryer with an inlet/outlet temperature of 170° C./80° C., respectively. The wet cakes were introduced in the hot air stream and after drying, the water content was 4.5 wt. % (see FIGS. 1a and 1b).

The conductivity was determined by using a calibrated WTW LF340 conductivity meter equipped with a Tetracon 325 probe. Calibration of the probe is carried out by Potassium chloride reference solution (1.41 mS/cm) from Merck (art nr. 1.01553.0001).

Wet particle size distribution is measured by a laser diffraction on a Malvern Mastersizer 2000G. Dry sample is added to the water filled sample chamber until a laser obscuration level in the range of 10 to 20% is obtained. Measurement is carried out for the duration of approximately 2 minutes. Particle size determined using the wet method were converted to dry particle size by division, using a conversion factor of 1.3.

Particle size distribution of dry potato protein samples is measured by laser diffraction using a Sympatec HELIOS equipped with a RODOS dry dispenser with a vibratory feeder. The RODOS dispersing line has an inner diameter of 4 mm. Particle sized is calculated by the integrated software using the "fraunhofer" formula.

The sugar content was determined by enzymatic analysis as published by megazyme (Ireland). This method makes use of a sucrose/fructose/D-glucose assay kit (art no. K-SU-FRG), and comprises an UV-method for the determination of sucrose, D-fructose and D-glucose in foodstuffs, beverages and other materials.

The color was determined by reflection. Reflected color of a sample is measured by a Hunterlab Colorflex EZ spectrophotometer calibrated with the relevant Hunterlab color standards. The sample cup is filled for at least 50% of the volume with protein powder and placed on the measuring window. Reflected color is reported as the y-value (reflection value) determined by the apparatus.

Bulk density of dried protein coagulate is measured by pouring a quantity of powder in a closed funnel with a calibrated cylinder of 0.5 liter underneath. Remove the slide of the funnel and allow the powder to flow freely into the cylinder. The excess of powder is scraped off with a ruler and the weight of the powder filled cylinder is measured on a Mettler Toledo PG5002-S scale. The free settled density of the powder is reported as g/l after subtraction of the weight of an empty cylinder.

TABLE 1 washing of the protein cake with washing water having
no sugars and a conductivity of 0.4 mS/cm Used washing water

| Time | conductivity | Total sugar content | Color Wash water |
|---|---|---|---|
| T = 0 min | 2.2 mS/cm | 0.54 mg/g | Slightly yellow |
| T = 15 min | 2.0 mS/cm | 0.54 mg/g | Slightly yellow |
| T = 17 min | 1.5 mS/cm | 0.30 mg/g | Slightly yellow |
| T = 20 min | 1.0 mS/cm | 0.14 mg/g | No color |

TABLE 2

Comparison of non-horny material according to the invention
with conventional, horny coagulated protein powder.

| | particle size (determined using wet method) | | | sugar | | | bulk |
|---|---|---|---|---|---|---|---|
| | d-10 [μm] | d-50 [μm] | d-90 [μm] | content mg/g | TGA mg/kg | color | density g/l |
| non-horny coagulated Washed protein powder (FIG. 1a) | 19 | 42 | 100 | 0.33 | 81 | 0.62 | 336 |
| horny coagulated conventionally washed protein powder (FIG. 1b) | 31 | 115 | 492 | 10 | 1253 | 0.41 | 550 |

Example 2

Potato juice was heat-coagulated at a temperature of 104° C. to obtain 12.9 gram solid protein particles/kg suspension. The protein particles were concentrated by means of a hydrocyclone to a solid concentration of 27.5 gram solid protein particles/kg.

Figure 2:
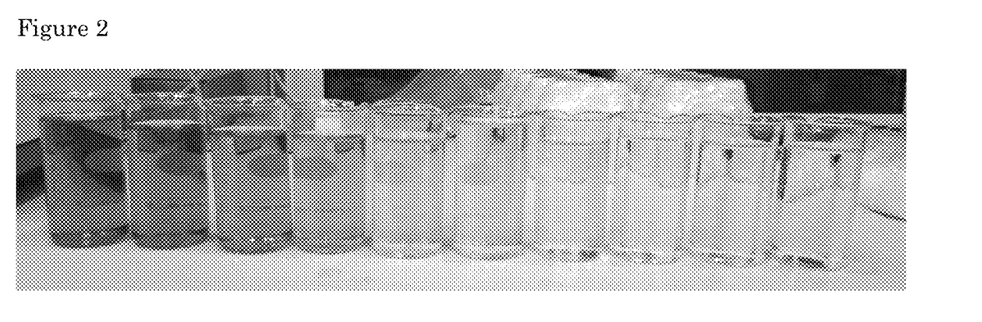
FIG. 2: color of washing water; from left to right: initial washings, acid was, water wash until conductivity of 1 mS/cm.
Figure 3:
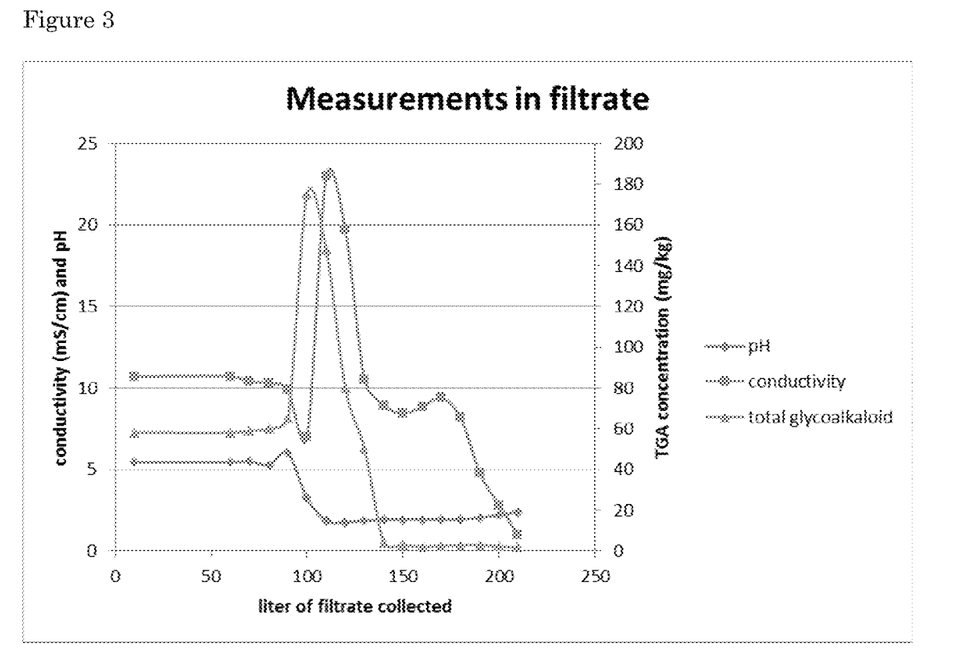
FIG. 3: pH, conductivity and total glycoalkaloid content in filtrate

To separate the particles from the liquid, the suspension was filtered using a filter element. After a filter-cake was formed on the filter element, the suspension inside the filter was replaced with acidified water (solution of 0.5% sulphuric acid in water, pH=1.3, conductivity Q=22 mS/cm) to effect an acid wash for 30 minutes. Subsequently, the sulphuric acid solution in the filter was replaced by cold water (conductivity 0.4 mS/cm) and further washed until the conductivity fell below 1 mS/cm in the filtrate. The color of the filtrate gradually improved as a result of the washing (FIGS. 2 & 3).

The protein cake inside the filter was dewatered by means of compressed air. Finally the cake was in a flash drier at 160° C. incoming air to a moisture content of 4.2 wt. %. The analytical data of the dry product were as followed:

TABLE 3

TGA analyses of dried, acid washed potato
protein and dried untreated potato protein

| | Dried washed protein | Typical untreated potato protein |
|---|---|---|
| TGA | <52 mg/kg | 1000-1500 mg/kg |

In table 3 it can be seen that "total glycoalkaloid content" of the dried potato protein is below the detection limit, which is sufficient for use in human food applications.

Example 3

Potato juice was heat-coagulated at a temperature of 104° C. to obtain 12.9 gram solid protein particles/kg suspension. The protein particles were separated from the juice by means of a two-phase decanter at 4000 g. The protein cake obtained had a dry solid content of 36.3 wt. %. The protein cake (86 kg) was resuspended in (420 liter) cold water to obtain a protein suspension of 6 wt. % solids. The coagulated protein was rinsed in this suspension by lowering the pH to a value of 3.2 by adding 10 kg sulphuric acid solution (10 wt. %), and subsequent filtering. The obtained solution had a conductivity of 2.3 mS/cm.

Sample 1. Preparation of a thoroughly washed sample (without neutralization).

To separate the protein particles from the rinsing liquid a candle filter was used. After 150 liter of filtrate was obtained with a pH of 3.5 and a conductivity of 2.35 mS/cm, the liquid (protein suspension) between the filter elements was replaced by cold water (conductivity 0.4 mS/cm). From that moment the thorough washing of the filter cake started. During the washing the conductivity of the filtrate was measured and the washing was continued until a value below 1 mS/cm. From that moment the wash water was replaced by air and the filter cake was dewatered to a water content of 72 wt. %. The sample was dried in a ring dryer to obtain a fine off-white powder.

Sample 2. Preparation of a thoroughly washed sample (with neutralization).

To separate the protein particles from the rinsing liquid a candle filter was used. After 150 liter of filtrate was obtained, the liquid (protein suspension) between the filter elements was replaced by cold water. From that moment the thorough washing of the filter cake started. During the washing the conductivity of the filtrate was measured and decreased to a value below 1 mS/cm. From that moment the wash water was replaced by air and the filter cake was dewatered to a water content of 72 wt. %. The filter cake was neutralized in a batch mixer to a pH-value between 6.5 and 7 by adding 60 gram of dry potassium carbonate to 6 kg of filter cake. The sample was dried in a ring dryer to obtain a fine off-white powder.

Sample 3. Preparation of a thoroughly washed sample (with neutralization) of very fine particles.

To obtain a very fine powder, part of the dry product sample 2, was wind-sifted using an Alpine Microplex MP 132. In this way a fine and a course fraction was obtained. The fine fraction was evaluated for its properties.

Sample 4. Preparation of a conventionally rinsed sample (with neutralization).

To separate the protein particles from the rinsing liquid a candle filter was used. After 150 liter of filtrate was obtained, the liquid (protein suspension) between the filter elements was replaced by air and the filter cake was dewatered to a water content of 70 wt. %. The filter cake was neutralized in a batch mixer to a pH-value between 6.5 and 7 by adding 60 gram dry potassium carbonate to 6 kg of filter cake. The sample was dried in a ring dryer to obtain a yellowish powder.

Sample 5. Preparation of an intermediate sample (with neutralization).

The neutralized filter cake from sample 2 and 4 were mixed in a 1:1 ratio in a batch mixer. The mixture was dried in a ring dryer to obtain an intermediate product.

TABLE 4 overview of prepared samples

| Sample | conventional rinse | thorough wash according to invention | Neutralizing | Drying | Wind-sifting |
|---|---|---|---|---|---|
| 1 | Yes | Yes | No (pH = 3-3.5) | Yes | No |
| 2 | Yes | Yes | Yes (pH = 6.5-7) | Yes | No |
| 3 | Yes | Yes | Yes (pH = 6.5-7) | Yes | Yes |
| 4 | Yes | No | Yes (pH = 6.5-7) | Yes | No |
| 5 | Yes | comparative | Yes (pH = 6.5-7) | Yes | No |

Figure 4:
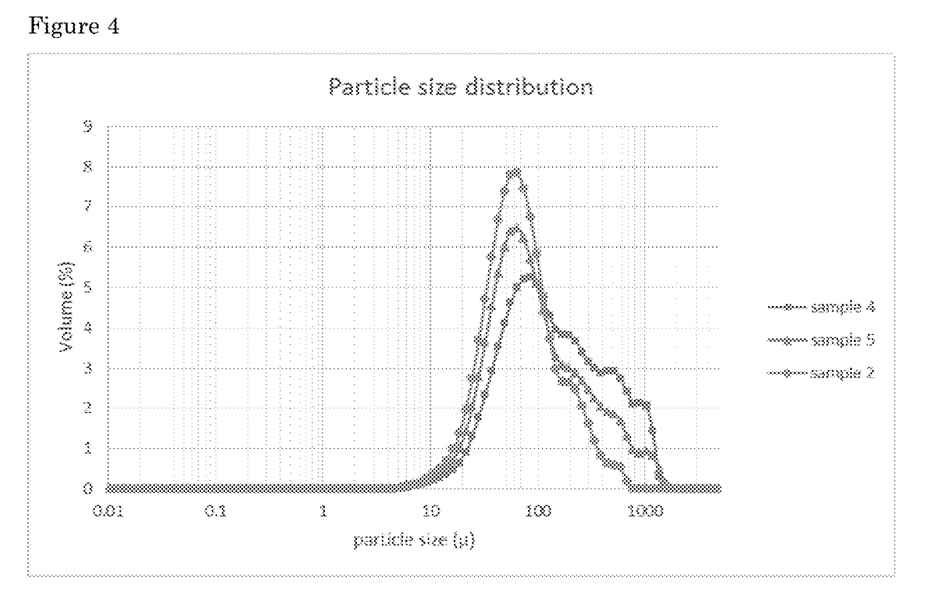
FIG. 4: Influence of washing on particle size distribution of dry potato protein. Blue line=sample 2, red line=sample 5, green line=sample 4.

To determine the effect of washing on the particle size of the dry product, samples 2, 4 and 5 were compared. Also see FIG. 4.

TABLE 5 particle size of dry powder obtained by washing according to the invention, conventional washing and no washing.

| | | d-10 | d-50 | d-90 | >425 μm |
|---|---|---|---|---|---|
| Potato protein (thoroughly washed) | Sample 2 | 27 μm | 65 μm | 210 μm | 2.8% |
| Potato protein (comparative) | Sample 5 | 30 μm | 83 μm | 448 μm | 14.2% |
| Potato protein (conventionally washed) | Sample 4 | 37 μm | 124 μm | 645 μm | 26.3% |

Sample 3 was subjected to fractionation to obtain a course fraction and a fine fraction. The results are given in table 6.

TABLE 6 particle size distribution of the coarse and fine fractions of a coagulated protein product.

| | Feed | Fine fraction | Coarse fraction |
|---|---|---|---|
| d-10 | 27 gm | 10 gm | 30 gm |
| d-50 | 65 gm | 21 gm | 61 gm |
| d-90 | 210 gm | 35 gm | 188 gm |
| Quantity | 8 kg (100%) | 1.5 kg (20%) | 6.5 kg (80%) |

The five different dry samples were evaluated for use as food-ingredient by a well trained sensoric panel (8 persons).

TABLE 7

Analyses of the dry potato powder. Sensory evaluations were performed as a 5% suspension in water.

| | sample | | | | |
|---|---|---|---|---|---|
| | 1 | 2 | 3 | 4 | 5 |
| Dry matter content [g/kg] | 945 | 969 | 942 | 945 | 947 |
| Protein content [g/kg] | 888 | 868 | 855 | 861 | 866 |
| Ash [mg/kg] | 5.3 | 42.7 | 38.4 | 38.1 | 43.1 |
| pH | 3.5 | 6.3 | 6.4 | 6.1 | 6.6 |
| Color | 0.62 | 0.58 | 0.62 | 0.48 | 0.55 |
| d-10 | 24 | 27 | 13 | 37 | 30 |
| d-50 | 59 | 65 | 27 | 124 | 83 |
| d-90 | 144 | 210 | 45 | 645 | 448 |
| taste | acidic | | Neutral/slightly bitter | | |
| mouthfeel | lightly sandy | lightly sandy | not sandy | very sandy | sandy |
| astringency | medium | | low | | |
| odor | | | low | | |
| Conclusion | acceptable in food application | | | not acceptable in food applications | |

From the table can be concluded that the samples which are thoroughly washed have the desired (organoleptic) properties for food application. The neutralized product has an improved taste for applications in a pH-neutral environment. In applications were mouthfeel is very important the fine fraction has the best performance in regard to mouthfeel.

Protein content on dry matter is determined by Kjeldahl method using a FOSS Kjeltec 8400 automated protein analysis system. A conversion factor of N×6.25 is used to convert nitrogen level to protein.

Ash content was determined by weighing a quantity of 5 gram protein accurately (error 0.1 mg) and heating for at least 3 hours in a 550° C. oven. After 3 hours the sample is cooled down to room temperature in an exsiccator and weighed again (0.1 mg accuracy).

The pH of the suspension is measured in a 1 gram/100 ml suspension in demineralized water by a calibrated pH meter.

Example 4

Figure 5:
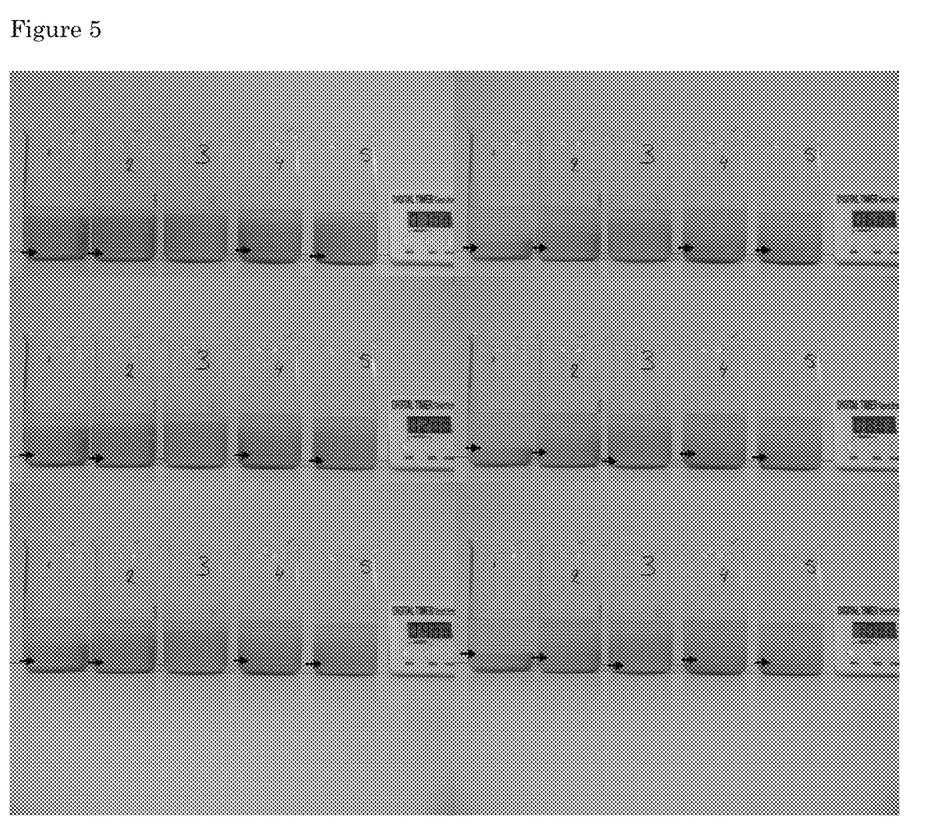
FIG. 5: Sediment layer formation in time of the samples produced in example 3 after 1, 2, 4, 6 8 and 10 minutes. Arrows indicate the sediment layer.

To determine the sedimentation behavior of the various protein samples prepared in example 3 a sedimentation test was performed. For this, 5 gram of protein powder was added to 95 gram of room temperature tap-water. The mixture was stirred to obtain a homogenous protein suspension. The suspension was transferred to a 100 ml measuring cylinder and the time was recorded. Sedimentation rate was measured by the sediment volume at the bottom of the cylinder at regular time intervals. The results can be seen in FIG. 5. It was found that coagulated protein which had been washed until the washing water had a conductivity of less than 1 mS/cm displayed slower sedimentation than non-washed or conventionally washed samples. It is irrelevant whether the protein has been neutralized or not.

Reduced sedimentation was observed for the fine fraction of the coagulated protein product.

Example 5

To be able to correlate the particle size as determined by the wet and dry methods, the following experiment was performed.

Potato protein was produced by means of the following process steps:
- heat coagulation of potato juice by direct steam injection (pH=5.5 and 104° C.).
- recovery of solid protein by means of a decanter (at 4000 g)
- resuspension of the protein cake in water (to a suspension of 6% ds).
- TGA extraction with sulphuric acid (at pH=3.3)
- Filtration and washing of protein cake with cold water (until conductivity <1 mS/cm)
- Drying of the cake in a flash drayer (at a T-in/T-out of 180/70° C.).
- Different samples in size were produced with a windsifter (wheel: between 2600-5300 rpm).

From the different samples the d-10, the d-50 and d-90 [μm] were analyzed by both the wet and the dry method (see FIG. 6). The dry particle size was analyzed with Sympatec Helios & Rodos as described above, and the wet particle size was analyzed with Malvern Mastersizer 2000G as described above.

From the graph it can be seen that the d-10, d-50 and d-90 (μm) value of a sample resuspended in water is a factor 1.3×higher than the d-10, d-50 and d-90 (μm value) of the dry particles. This increase in diameter of the particles (expansion/swelling) can be explained by the absorption of water. This value has been used as a conversion factor to report all particle size values determined using the wet method as particle size determined using the dry method. It has been indicated when a particle size has been determined using the wet method, even though the calculated result for the dry method is reported.

The invention claimed is:

1. A coagulated root or tuber protein powder having a glycoalkaloid content of below 100-mg/kg dry weight, wherein the d-10 is less than 30 μm, the d-50 is less than 75 μm, and the d-90 is less than 250 μm, expressed on a dry product, and wherein the total content of glucose, fructose and sucrose is less than 0.5 g/kg dry weight, wherein the bulk density of the protein powder is less than 475 g/l, wherein the protein content is at least 85 wt. %, as determined by Kjeldahl nitrogen, wherein the protein powder has not been subjected to a step which actively reduces particle size of the protein powder by physical means.

2. A coagulated root or tuber protein powder according to claim 1, wherein the color of the protein powder by reflection is >0.50.

3. A coagulated root or tuber protein product as defined in claim 1, obtainable by a method comprising
   a) subjecting the root or tuber fruit juice to a coagulation step to obtain coagulated protein;
   b) collecting the coagulated protein;
   c) washing the coagulated protein with washing water having a conductivity of below 1 mS/cm to obtain used washing water and washed coagulated protein; and
   d) drying the washed coagulated protein,
   wherein washing is continued until the used washing water has a conductivity of less than 2 mS/cm.

4. A method to obtain a coagulated root or tuber protein powder from a root or tuber fruit juice, comprising
   a) subjecting the root or tuber fruit juice to a coagulation step to obtain coagulated protein;
   b) collecting the coagulated protein;
   c) washing the coagulated protein with washing water having a conductivity of below 1 mS/cm to obtain used washing water and washed coagulated protein; and
   d) drying the washed coagulated protein,
   wherein washing is continued until the used washing water has a conductivity of less than 2 mS/cm, wherein the coagulated root or tuber protein powder has a glycoalkaloid content of below 100-mg/kg dry weight, wherein the d-10 is less than 30 μm, the d-50 is less than 75 μm, and the d-90 is less than 250 μm, expressed on a dry product, and wherein the total content of glucose, fructose and sucrose is less than 0.5 g/kg dry weight.

5. A method according to claim 4, wherein washing is continued until the used washing water has a conductivity of less than 1 mS/cm.

6. A method according to claim 4, wherein the washing is continued until the content of glucose, fructose and sucrose in the used washing water is less than 0.54 mg/g.

7. A method according to claim 4, wherein the method further comprises a step of neutralizing the coagulated protein to a pH of 6.5-7.

8. A method according to claim 4, wherein the method further comprises a glycoalkaloid extraction procedure.

9. A method according to claim 4, wherein the coagulated root or tuber protein powder is subsequently fractionated into at least a first fraction and a second fraction.

10. A method according to claim 9, wherein the first fraction has a d-50 of at most 35 μm.

11. A method according to claim 9, wherein the second fraction has a d-50 of 42-69 μm.

12. Use of a coagulated root or tuber protein as defined in claim 1 in human food applications, wherein the human food application is chosen from the group consisting of a drink, a protein bar, a granola bar, a health bar, soup, breakfast cereal, baked good, baking mix, pizza, pasta, deli meat, ham, sausage, vegetable-based meat analogue, and vegetable protein, wherein the coagulated root or tuber protein powder is suspended in a liquid and added to the human food application.

13. Use according to claim 12, wherein the food is a drink, wherein the coagulated root or tuber protein powder added to the drink with a stabilizer to create a stable suspension.

14. A coagulated root or tuber protein powder according to claim 1, wherein the powder is non-horny.

15. A coagulated root or tuber protein powder according to claim 3, wherein the powder is non-horny.

16. A coagulated root or tuber protein product as defined in claim 1, obtainable by a method comprising
   a) subjecting root or tuber fruit juice to a coagulation step to obtain coagulated protein;
   b) collecting the coagulated protein; and
   c) washing the coagulated protein with washing water having a conductivity of below 2 mS/cm,
   wherein the washing continues until sticky substances have been reduced to a sufficient level, such that the coagulated protein is non-horny.

17. A coagulated root or tuber protein product as defined in claim 16, wherein the sticky substances are chosen from the group consisting of sugars, potassium, organic acids, and amino acids.

18. A coagulated root or tuber protein product as defined in claim 17, wherein the washing water has a conductivity of below 1 mS/cm.

* * * * *